June 7, 1932.  T. C. SMITH ET AL  1,861,556
CABLE REEL TRAILER
Filed Jan. 29, 1931   4 Sheets-Sheet 1

INVENTORS
T. C. Smith and
BY W. T. Livermore
ATTORNEY

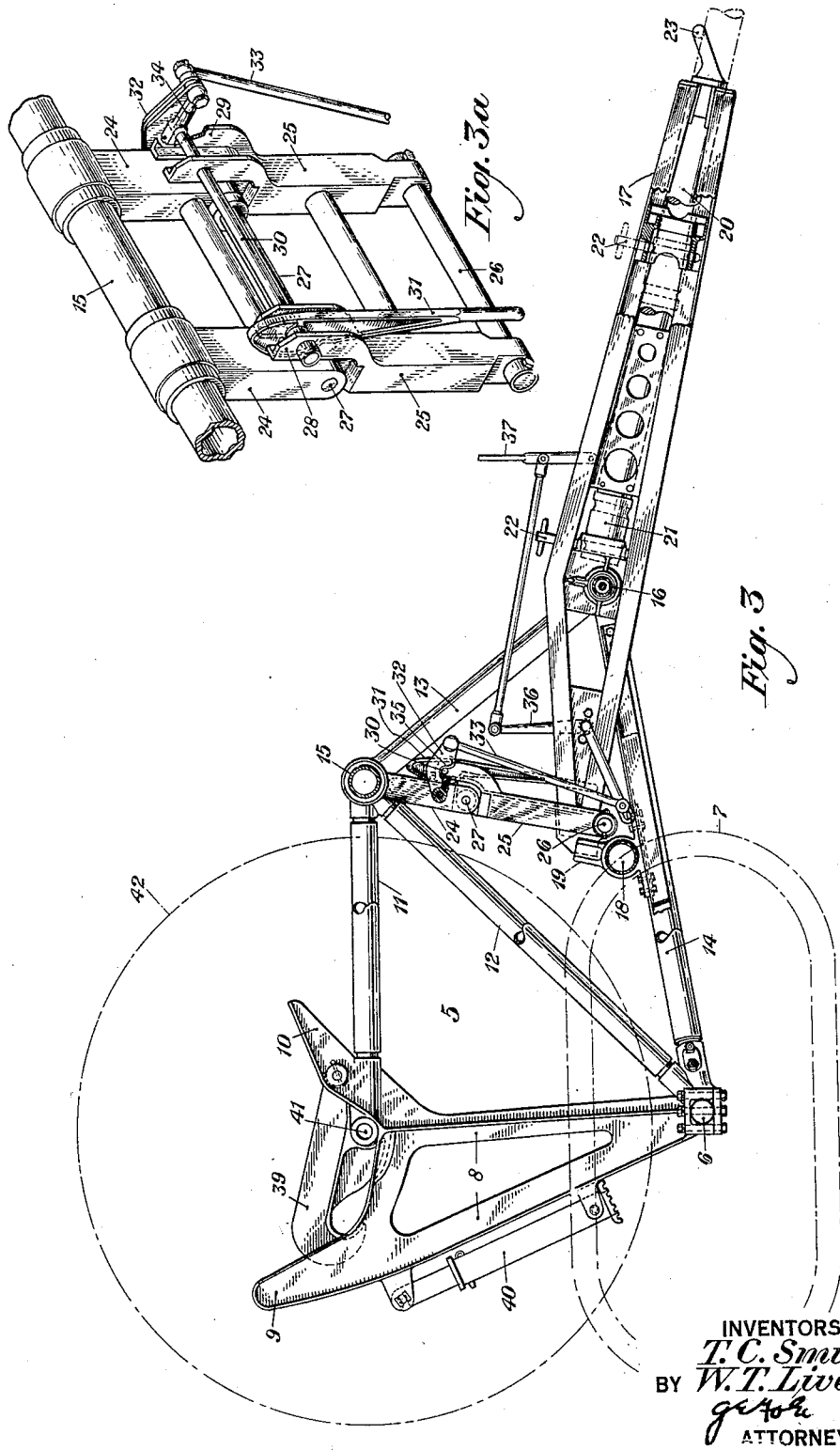

June 7, 1932. T. C. SMITH ET AL 1,861,556
CABLE REEL TRAILER
Filed Jan. 29, 1931 4 Sheets-Sheet 4

INVENTORS
T. C. Smith and
BY W. T. Livermore
ATTORNEY

Patented June 7, 1932

1,861,556

UNITED STATES PATENT OFFICE

TEMPLE C. SMITH AND WILLIAM T. LIVERMORE, OF WESTFIELD, NEW JERSEY, ASSIGNORS TO AMERICAN TELEPHONE AND TELEGRAPH COMPANY, A CORPORATION OF NEW YORK

CABLE REEL TRAILER

Application filed January 29, 1931. Serial No. 512,154.

This invention relates to trailers, and more particularly to devices of this character which are adapted to be used in connection with the loading, transporting and unloading of cable reels.

One of the objects of the invention consists in the provision of a collapsible trailer including a main frame mounted to rotate on suitable mobile supporting members, such as wheels or the like, where it may be rotated to load or unload cable reels, and having a rotatable tongue which may be attached to a tractor vehicle whereby when the main frame is rotated or tilted rearwardly and engages the projecting ends of a cable reel spindle, the forward movement of the tongue will automatically straighten the main frame so that it will lift and carry the cable reel.

Another object consists in the provision of locking mechanism by which the trailer may be held in either a collapsed or in an extended position.

A further object is to provide a connection between the tongue portion and main frame of the trailer whereby the trailer may be attached to a tractor or the like and require no disconnection therefrom throughout the entire loading and unloading operations of the trailer.

These and further objects will be apparent from the following description, when considered in connection with the accompanying drawings in which one modification of the invention is illustrated.

Figure 2:
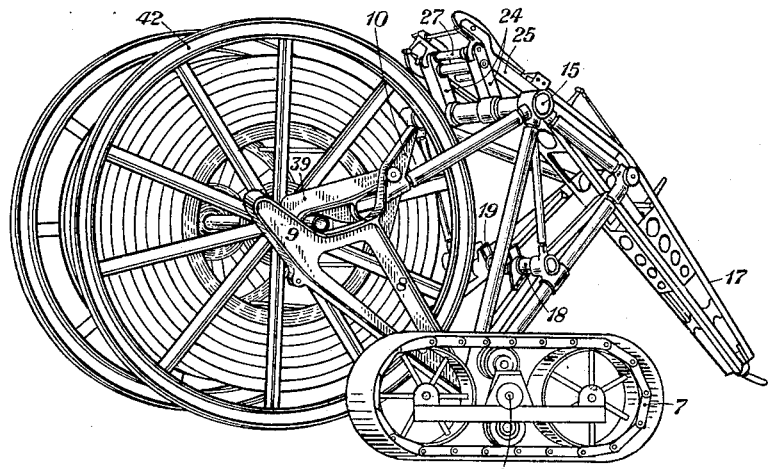
Figure 1:
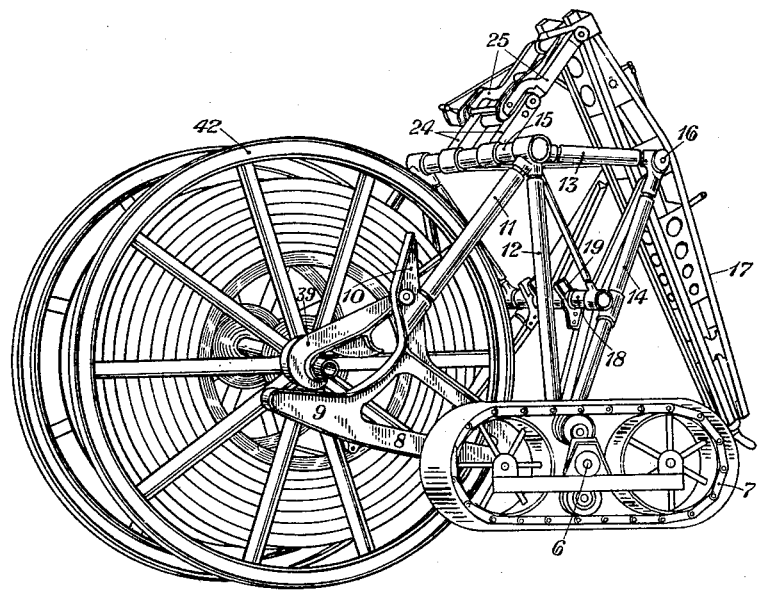

In the drawings, Figure 1 is a perspective view of the improved device in a collapsed or unloaded position; Fig. 2 is a view showing the device in a semi-loaded position; Fig. 3 is a side view showing the trailer in a normal or loaded position; Fig. 3a is a perspective view of the control detail by which the trailer is operated to an unlocked position and back to a locked position; Figs. 4, 5, 6, 7, 8 and 9 are schematic views showing the various forms assumed by the trailer in its operation from a normal or loaded position to a collapsed or unloaded position.

Referring to the drawings in which the improved device is illustrated, the reference 5 is applied to the main frame or body portion, which may be made of metal tubing or the like. The body portion includes parallel side frame members of similar construction connected together by cross-brace bars, and is carried on an axle 6 which may be supported on wheels or on a track assembly 7, as shown. Each of the side frame portions of the body member 5 includes a substantially vertical member 8 which extends from the axle and terminates in a saddle portion. The saddle portions on each of the side frames form parallel supports carrying a cable reel. The saddle portions include rearwardly positioned flared members 9 which function as guides for the trailer in its loading position as it is backed into a cable reel to engage the spindle extending therethrough. Stops 10 are provided on the opposite or forward ends of the saddle portions for limiting the backward travel of the trailer in maneuvering it into a position for loading the cable reel on the saddle portions. These stops also function to limit forward movement of the cable reel when it is positioned on the saddle members. The cable reel will be held supported on the saddle portions while being transported from one place to another, in a manner to be presently described. Each of the parallel side frame members of the body portion 5, as is more clearly shown in Fig. 3, includes horizontal members 11, rearwardly inclined members 12, forwardly inclined members 13 and lower side members 14. These members comprising one side frame are connected by cross-braces to corresponding members of the opposite side frame, as will presently appear. The side frames thus form a rugged and rigid frame-work for supporting a cable reel. The horizontal members 11 of each side frame extend forwardly from the saddle portions and terminate with the upper ends of the members 12 and 13 at a junction point where the various members just mentioned are joined to a cross-brace 15 which interconnects with a similar point on the opposite side frame. The rear ends of the members 12 and 14 of each of the side frames are connected to the axle box provided at the lower end of the support 8, and the forward ends of the members 13 and 14 of each side frame are interconnected by a cross-brace 16. The opposite sides of the main frame are thus held in fixed spaced relation and present no interference to free access to the rear of the trailer in the loading or unloading of a cable reel on its saddle members. The side frame members being connected to the axle box in the manner outlined permit the main frame to be readily rotated upon the axle 6.

A tongue 17 is suitably connected with the cross-member 16 to fulcrum thereon, and the major portion of the tongue extends forwardly of this pivotal connection. The tongue member may include framework having four angle irons positioned therein in such relation that they form a substantially elongated rectangular structure which may be suitably reenforced throughout its length by gusset work or the like. The rear end of the tongue in the loaded or normal position of the trailer is supported on a transverse member 18 extending between the side frames, and vertical shoulders 19 carried by the member 18 and positioned on each side of the tongue serve to prevent any substantial lateral movement thereof. Castings are provided to form guides in the interior of the tongue in which an extensible member 20 is reciprocally mounted. The inner end of the member 20 in its retracted position will register in a socket 21 carried in the interior of the tongue 17, and a pin 22 passing through openings in these members will maintain the extensible member in this position. The pin 22 may be withdrawn from the socket when it is desired to extend the member 20 from the tongue for the purpose of providing additional lifting power or effectiveness which may be required in such cases as when the cable reel is positioned on slippery ground or at a lower level than that of the wheels or tracks, as shown for instance in the position of the reel in Fig. 1. The member 20 under this condition may be pulled out of the tongue a desired distance, and the pin 22 may be then inserted through a selected opening of a series in the forward portion of the tongue and through the opening in the end of the member 20, thus holding said member in a desired extended position. The forward end of the extensible member may be provided with suitable coupling means, such for instance as a ring 23 or the like, by means of which the trailer may be attached to a motor truck or other tractor device.

The inner end of the tongue 17 is shown as being joined to the transverse member 15 of the main frame by means of a toggle connection. This connection may consist of a pair of parallel links 24 pivotally connected to the transverse member 15, and a pair of parallel links 25 pivotally connected to a transverse bar 26 carried on the inner end of the tongue. The pairs of parallel links 24 and 25 are hingedly connected to each other on the ends of a transverse bar 27, and other transverse bars extending between the parallel links may be provided for reinforcement. The upper ends of the links 25 are provided with fixed extensions 28 and 29 which form stops to limit the travel of the links. These extensions may be formed of parallel plates having open front portions and slotted rear portions as more clearly shown in Fig. 3a. A rod 30 extends between these plates and is journaled thereon. A lever 31 may be affixed if desired to the rod 30 to aid in starting the breaking action of the toggle connection. This lever may be positioned between the plates of the extensions 28 and said lever may be provided at one end with a cam portion which may be operated by a handle portion at the other end of the lever to bear against the surface of one of the links 24. A plate 32 is attached at one end to a link 24 and a rod 33 connected to actuating linkage, to be presently described, is pivotally mounted by a bolt or the like, to the other end of said plate. Said bolt may extend through the plate and be connected to an arm 34 on the inner side of the plate 32 and this arm may be secured to the transverse rod 30. The plate 32 and arm 34 provide an auxiliary toggle connection which control the locking and unlocking of the main toggle connection between the leaks 24 and 25 as will be presently described. A semi-circular slot is provided in the bottom of the plate through which the end of the rod 30 extends. The end of the rod is engaged by a spring 35 positioned in said slot which exerts pressure on said rod. A latch is thus provided by which the main toggle connections, including the links 24 and 25, is locked and unlocked. The rod 33 is shown as being connected to a bell crank 36 pivotally associated with the inner end of the tongue 17 of the trailer. This lever may be connected to a control lever 37 which actuates the linkage connected to the latching mechanism to cause it to lock and unlock the toggle connection between the links 24 and 25, whereby the trailer may be operated from a normal transporting position to a collapsed unloading position, and back to normal position.

Each of the saddle members is shown as provided with a shaft or spindle engaging hooks or pawls 39 which may be pivoted to the forward portions 10 of the saddle members. These hooks may be provided with rear and front fingers. The rear fingers are adapted to assist in holding the ends or trunnions of the spindle 41 and the cable reel 42 carried thereby on the members 9 of the saddle portions, and the front fingers of said hooks are adapted to securely lock said spindle and reel when they are rolled forwardly on the saddle members into the position they will occupy while being transported by the trailer.

A jack 40 may be attached to the rear of each of the members 9 of the saddle portions, if desired, to assist in the support of the trailer when disconnected from the towing vehicle. These jacks may be collapsed and held in the position shown in Fig. 3 when the trailer is being hauled. When the main frame is tilted rearwardly to load or unload a cable reel said jacks may be unbolted and placed on the ground in an extended position to function as supports during such operation.

Figure 4:
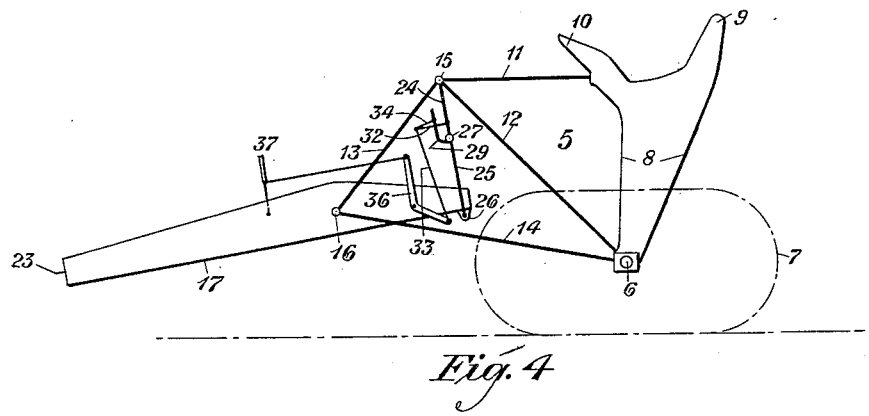
Figure 5:
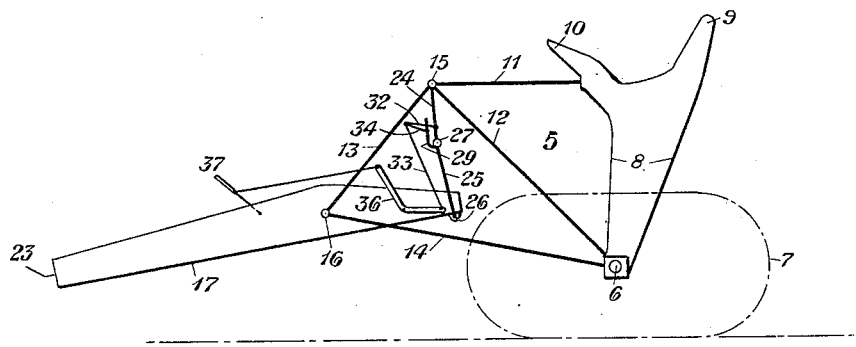

In the schematic view of the device shown in Fig. 4 of the drawings, the trailer is illustrated as being in an extended position. The trailer will assume this position when being hauled in either a loaded or unloaded condition. It will be understood that when it is desired to collapse the trailer for the purpose of loading or unloading a cable reel, the trailer is maneuvered into the approximate position it is to occupy during such operation. The trailer being in the desired position, the control lever 37 will be pulled forwardly, causing motion to be imparted through the bell crank lever 36 and associated linkage to disengage the latching mechanism by elevating the plate 32 so that it will release the transverse rod 30 and break the toggle connection between the links 24 and 25. The release of the latching mechanism will permit the tilting of the main frame and its cable supporting portion toward the rear, and the preliminary movement of the main frame in this direction is illustrated in Fig. 5. It will be noted that the links 24 and 25 are moved from their substantially vertical position, as shown in Fig. 4, to an oppositely inclined position with respect to each other, as shown in Fig. 5. As the main frame continues its rearward or clockwise rotation about the axle under the weight of said frame member, or under the added weight of a cable reel should the trailer be loaded, as controlled by rearward movement of the draft bar or tongue under force exerted thereon by the backing of its attached tractor vehicle, the link members 24 and 25 sequentially assume the positions shown in Figs. 6, 7 and 8.

Figure 6:
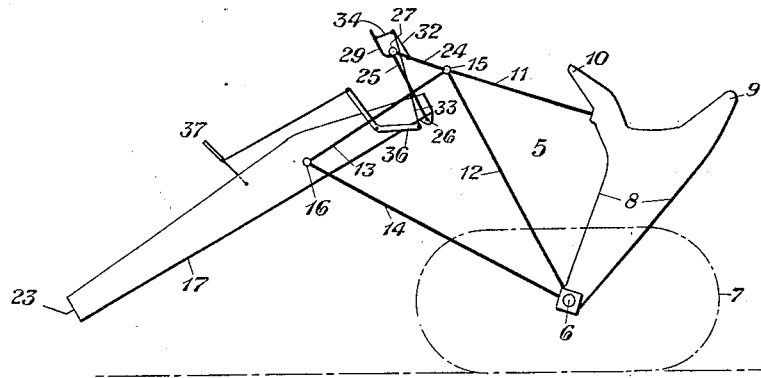
Figure 7:
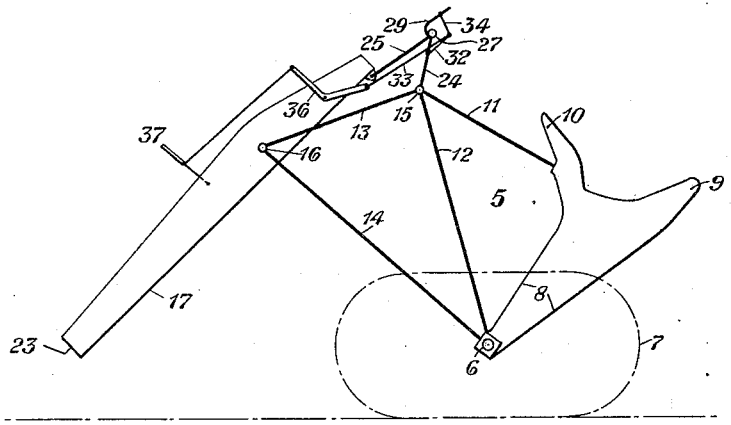
Figure 8:
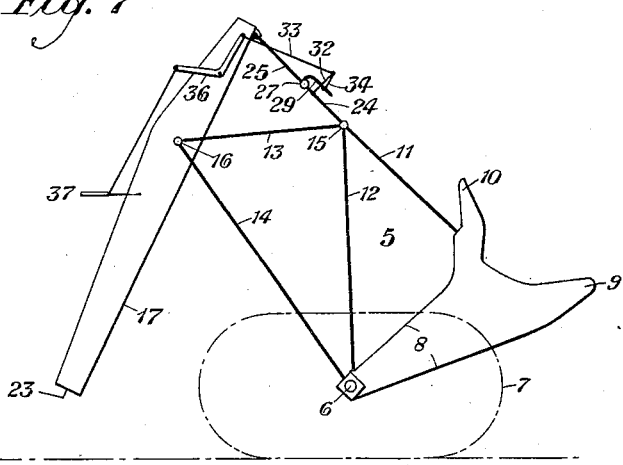
Figure 9:
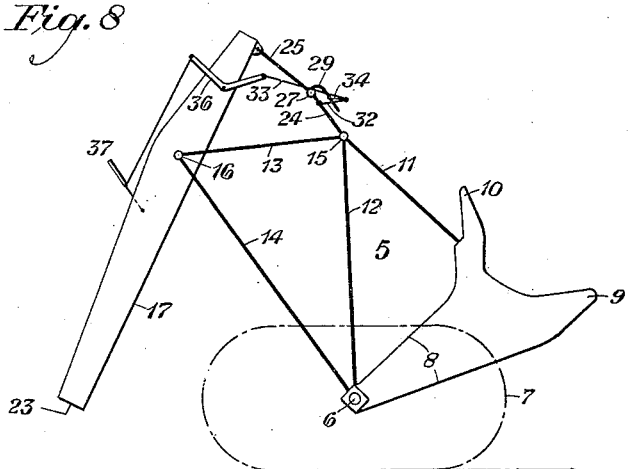

The links 24 and 25 continue to approach each other as the main frame member is rotated in one direction and the tongue member is rotated in the opposite direction until the links assume the angular relation shown in Fig. 6. The link members remain in substantially this same angular relation while being rotated to the position shown in Fig. 7. In Fig. 8 the trailer is shown in its extreme collapsed position and a cable reel may be loaded or unloaded in this position. In this position the links 24 and 25 are in alinement with each other so that the latching mechanism again functions and interlocks the tongue 17 and frame 5. In the case of loading a cable reel, the trailer may be maneuvered in this position so that the flared guides 9 pass under the trunnions or ends of the spindle protruding through the sides of a cable reel, and the rear fingers of the hook members 39 are closed thereon. When the reel is thus seated, the control handle 37 is operated to the position shown in Fig. 9, thereby raising the latching mechanism and breaking the toggle connection between the links 24 and 25. The links 24 and 25 under this condition will have moved from their alined position, as shown in Fig. 8, and will assume a slightly angular relation to each other, as shown in Fig. 9. As the trailer is returning from its collapsed position to its extended position, the links 24 and 25 will assume positions in reverse order to that described in connection with the operation of the trailer from an extended position to a collapsed position.

When the cable reel is held by the rear fingers of the hook 39, as above described, with the tongue 17 and frame member in unlocked position, the tongue may be drawn forwardly by the tractor vehicle to which it is attached. The tongue under this condition will rotate in a clockwise direction, while the main frame member will rotate in the opposite direction until these members assume a substantially horizontal position, as shown in Figs. 3 and 4. In this position the link members 24 and 25 will again assume their locked condition.

As the saddle members assume their normal upright positions, the trunnions of the cable reel will become disengaged from the rear fingers of the hook member 39 and the reel will roll forward on the saddle members to have its trunnions reengaged with the forward fingers of said hook member and be locked in transporting position on the saddle members thereby.

In the case of unloading the cable reel the trailer is brought to the position shown in Fig. 8, thereby placing the reel on the ground. The hooks 39 can then be lifted to disengage the reel trunnions.

What is claimed is:

1. A trailer including an axle and mobile supporting members therefor, a main frame member and saddle member rigidly connected together and rotatively mounted on said axle, a rigid tongue structure pivotally connected with the frame member so that the tongue structure and frame member may be moved from an extended position to a collapsed position and back to an extended position, means connecting the tongue and main frame member so arranged that when said tongue structure is bodily rotated about said pivotal connection in one direction the frame member and saddle member will rotate about said axle in a direction opposite to the direction of rotation of the tongue structure, and means for locking the tongue structure and frame member in their extended position and also in their collapsed position.

2. A trailer including an axle and mobile supporting members therefor, a saddle member and a frame member rigidly connected together and arranged to rotate on said axle, a rigid tongue structure pivoted to said frame member and having an end to which power may be applied, means to lock said tongue structure in extended position with respect to said frame member, means connecting said tongue structure and frame member so that as the end of the tongue structure approaches said axle said frame member and saddle member will be rotated about said axle, and means to lock said frame member and said tongue structure in their rotated position.

3. A trailer adapted to be connected to a tractor vehicle, an axle and mobile supporting members for the trailer, a frame member and a saddle member rigidly connected together and arranged to rotate upon said axle member, a rigid tongue structure pivoted adjacent one end to said frame member and at the other end attached to the tractor vehicle to have power applied thereby, means to rigidly lock the pivoted end of said tongue structure to said frame member, toggle means to unlock said means thereby permitting the tractor-attached end of the tongue structure to approach said axle to cause said frame and saddle members to rotate upon said axle, and means to lock said tongue structure and said frame member in such rotated position.

4. A trailer including an axle and mobile supporting members therefor, a frame member and a saddle member rigidly connected together and arranged to rotate upon said axle, a rigid tongue structure pivoted at a point intermediate its ends to said frame member, one end of said tongue structure being adapted to have power applied thereto, a toggle connection between the opposite end of said tongue structure and a point on said frame to rigidly lock said tongue structure to said frame, said toggle connection being so arranged with respect to said tongue structure and said frame that when the toggle connection is broken the power end of said tongue may be caused to approach said axle thereby permitting said tongue and said frame to rotate in opposite directions with respect to each other about the power end of said tongue and about said axle respectively until the opposite end of said tongue structure has assumed such position with respect to the point on said frame to which the toggle connection is attached that the links of said toggle connection may again assume a rigid position to lock the tongue structure and frame member in their rotated positions.

5. A trailer including an axle and mobile supporting members therefor, a saddle member and a frame member rigidly connected together and arranged to rotate on said axle, a bodily rotatable and rigid tongue structure pivoted to said frame member and having an end to which power may be applied, means to lock said tongue structure to said frame member, means to connect said tongue structure and frame member so that as the last mentioned end of the tongue structure approaches said axle, said frame member and saddle member will be rotated about said axle, and means to lock said frame member and said tongue structure in their rotated position.

6. A trailer for carrying cable reels and the like including an axle and mobile supporting members therefor, a frame rotatably mounted on said axle and arranged to move from an extended position to a collapsed position and back to an extended position, cable reel supports carried by said frame, and means pivotally connected to said supports and having rear hook members and front hook members, said rear hook members being arranged to cooperate with the reel supports to engage a cable reel in the collapsed position of the frame and said front hook members being arranged to lock said reel to the supports when the frame is moved to its extended position.

7. A trailer for carrying cable reels and the like including an axle and mobile supporting members therefor, a frame rotatably mounted on said axle, a rigid tongue structure pivotally connected to said frame and movable therewith from an extended position to a collapsed position and back to an extended position, and means extensibly connected to the tongue structure for providing additional effectiveness to lift a cable reel on the frame when it is being moved from its collapsed position to its extended position.

8. A trailer for carrying cable reels and the like including an axle and mobile supporting members therefor, a frame rotatably mounted on said axle, a rigid tongue structure pivotally connected to said frame and arranged to move therewith from an extended position to a collapsed position and back to an extended position, cable reel supports carried by said frame, means pivotally connected to said supports and having rear hook members and front hook members, said rear hook members being arranged to cooperate with the reel supports to engage a cable reel in the collapsed position of the frame and said front hook members locking said reel to the supports when the frame is moved to its extended position, and means extensibly mounted in the tongue structure for providing additional effectiveness to lift a cable reel on said cable supports when the tongue structure and frame are being moved from a collapsed position to an extended position.

9. A trailer including an axle and mobile supporting members therefor, a frame member and a saddle member rigidly connected together and rotatively mounted on said axle, a rigid tongue structure, pivotal means so connecting the tongue structure and said frame member that as the tongue structure is bodily rotated in one direction about said pivotal means, the frame member and saddle member will be rotated about said axle in a direction opposite to the direction of rotation of the tongue structure, means including a toggle connection for locking the frame member and tongue structure in their normal position and also in their rotated position, and means including an auxiliary toggle connection for controlling the last mentioned means.

10. A trailer including an axle and mobile supporting members therefor, a saddle member and a frame member rigidly connected together and arranged to rotate on said axle, a rigid tongue structure pivoted to said frame member and having an end to which power may be applied, means including a toggle connection to lock said tongue structure to said frame member, said tongue structure and frame member being so connected that as the power end of the tongue structure approaches said axle, said frame member and saddle member will be rotated about said axle, and means including a second toggle connection to lock said frame member and said tongue structure in their normal position and also in their rotated position.

11. A trailer adapted to be connected to a tractor vehicle, an axle and mobile supporting members for the trailer, a frame member and a saddle member rigidly connected together and arranged to rotate upon said axle member, a rigid tongue structure pivoted adjacent one end of said frame member and at the other end attached to the tractor vehicle to have power applied thereby, means including a main toggle connection to rigidly lock the pivoted end of said tongue structure to said frame member, means including an auxiliary toggle connection to unlock said means thereby permitting the tractor-attached end of the tongue structure to approach said axle to cause said frame and saddle members to rotate upon said axle, and means to lock said tongue structure and said frame member in such rotated position.

In testimony whereof we have signed our names to this specification this 28th day of January, 1931.

TEMPLE C. SMITH.
WILLIAM T. LIVERMORE.